June 8, 1965     J. K. MUREK     3,187,548
HIGH ENERGY MACHINE
Filed Sept. 13, 1961     7 Sheets-Sheet 1
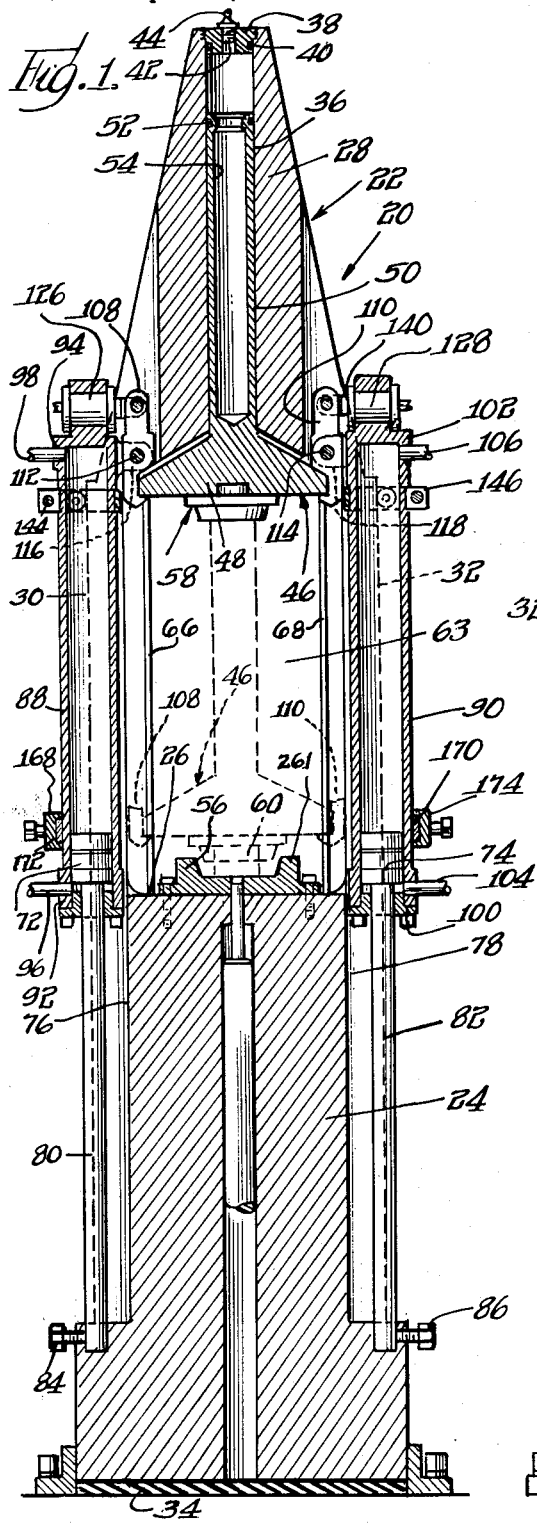
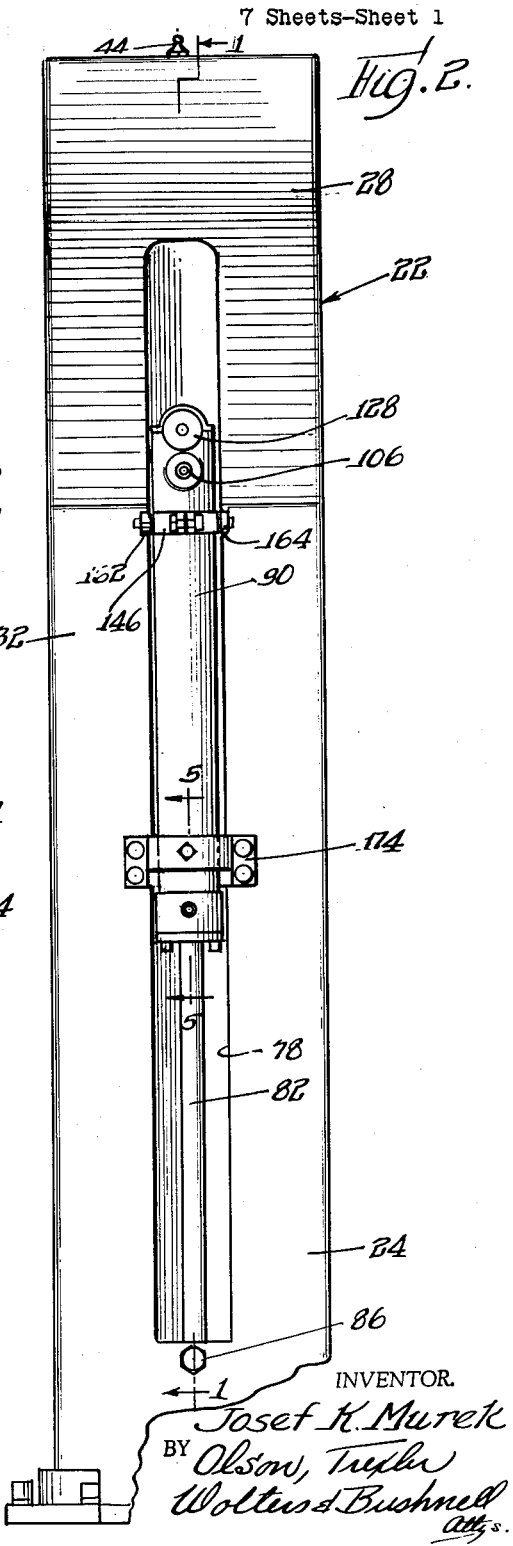
INVENTOR.
Josef K. Murek
BY Olson, Trexler
Wolters & Bushnell
attys.

June 8, 1965  J. K. MUREK  3,187,548
HIGH ENERGY MACHINE
Filed Sept. 13, 1961  7 Sheets-Sheet 2
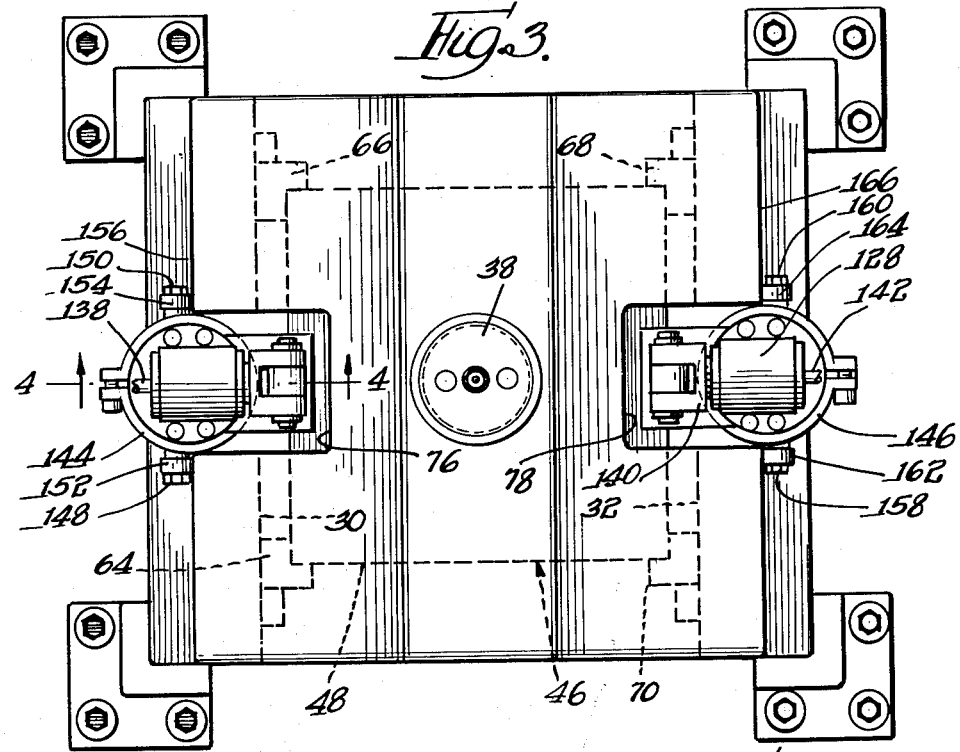
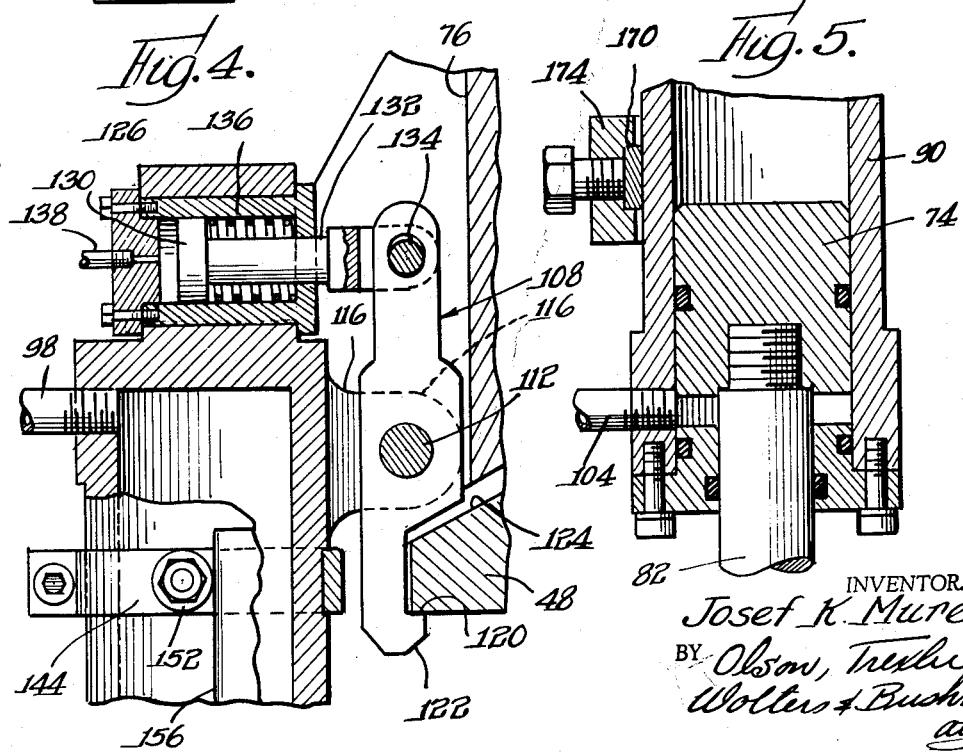
INVENTOR.
Josef K. Murek
BY Olson, Trexler
Wolters & Bushnell
attys.

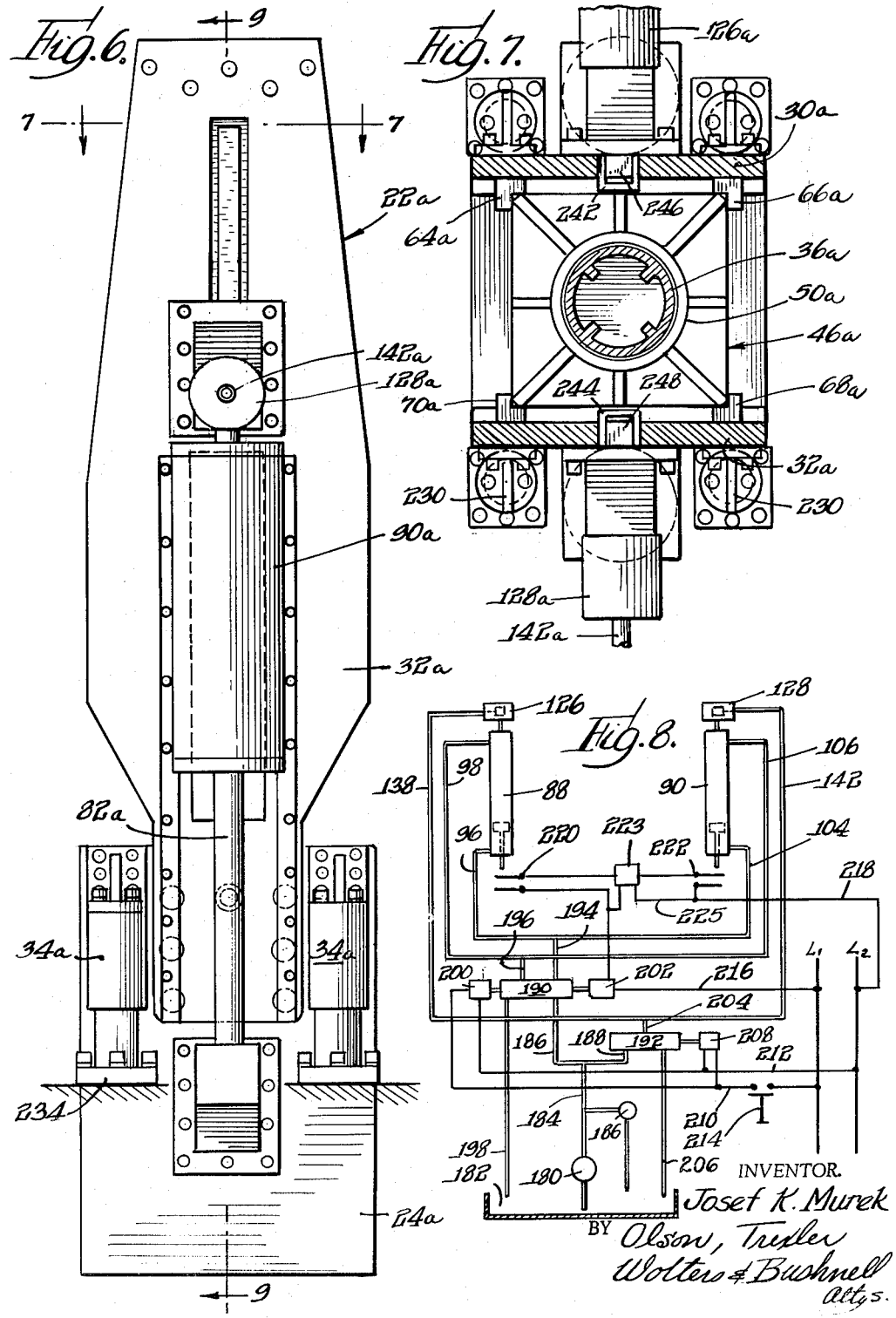

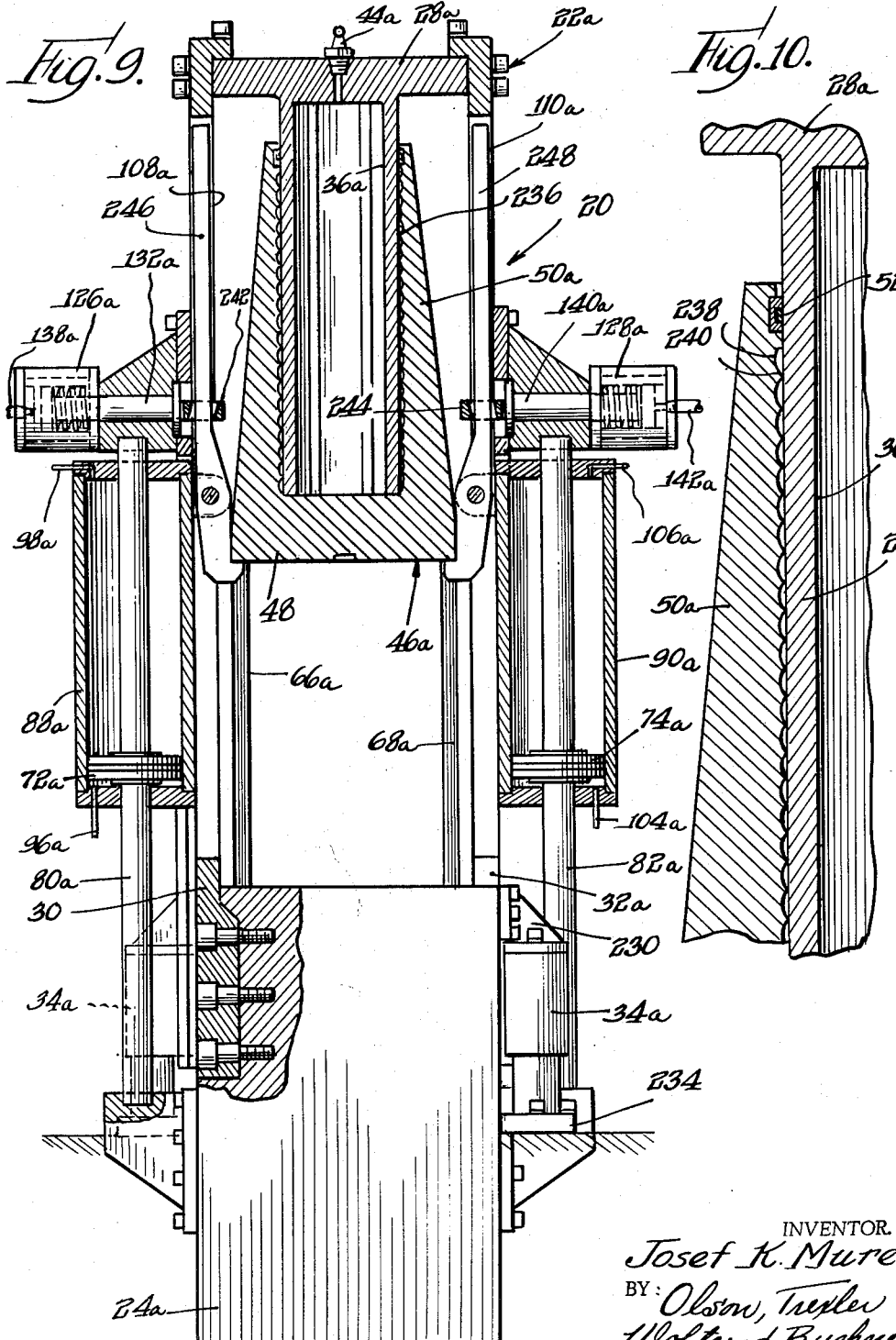

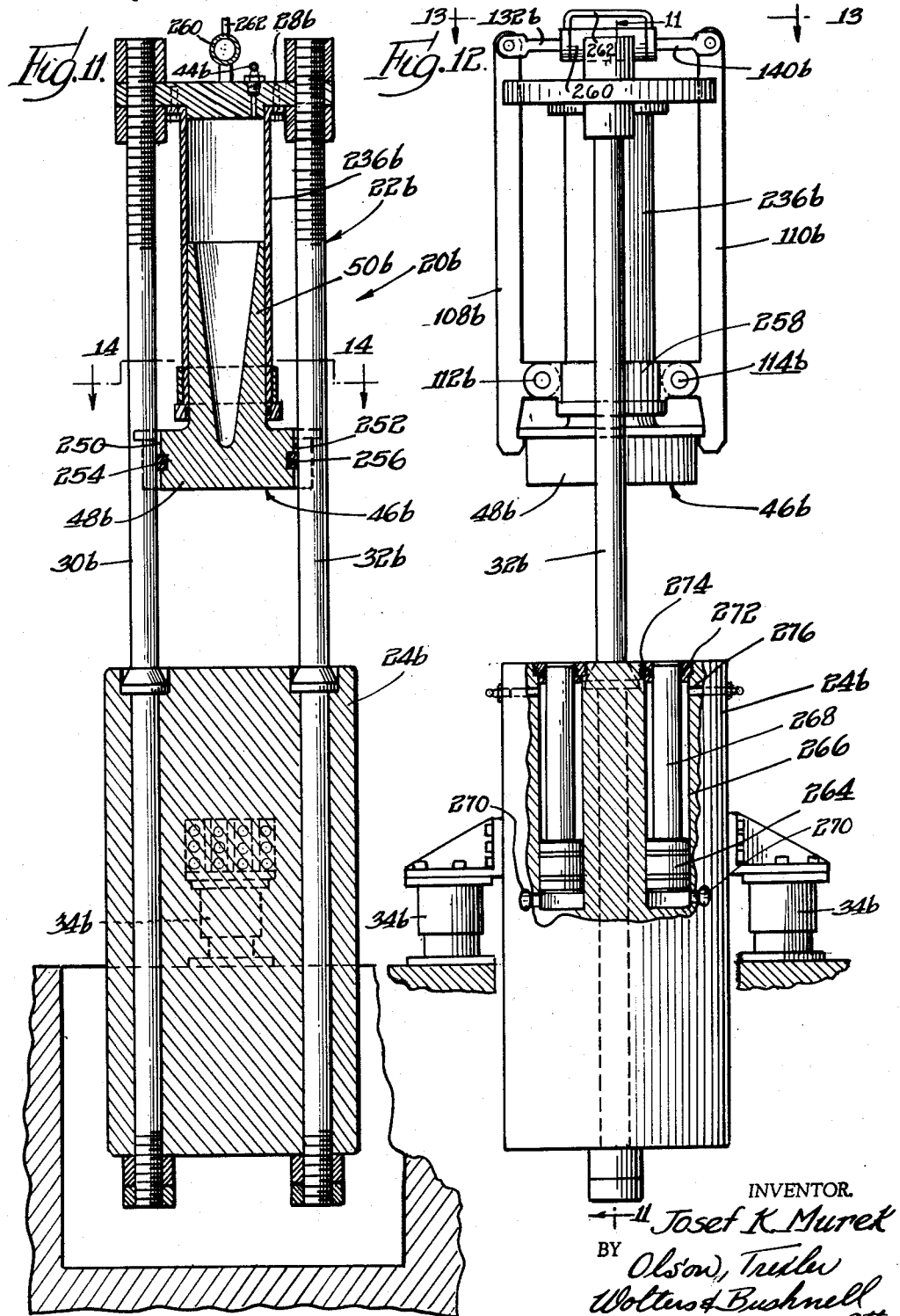

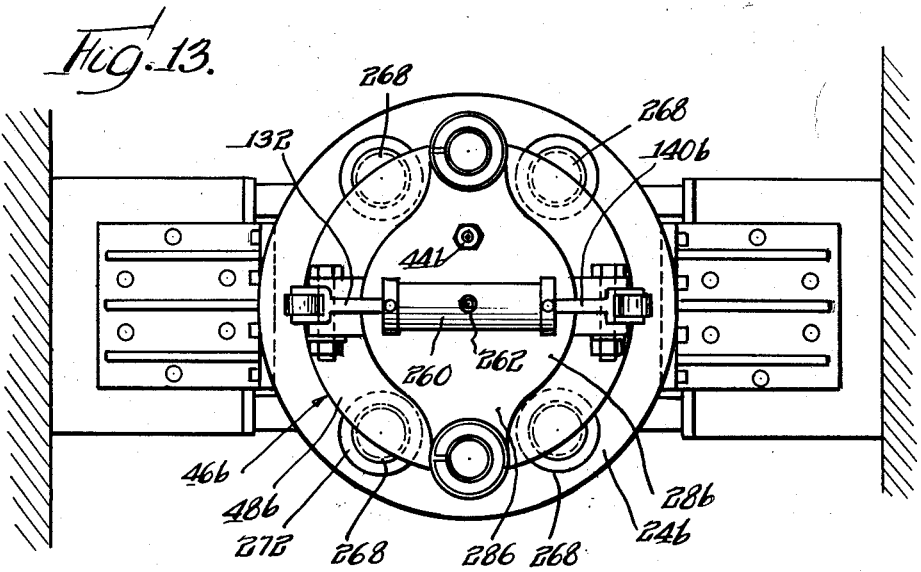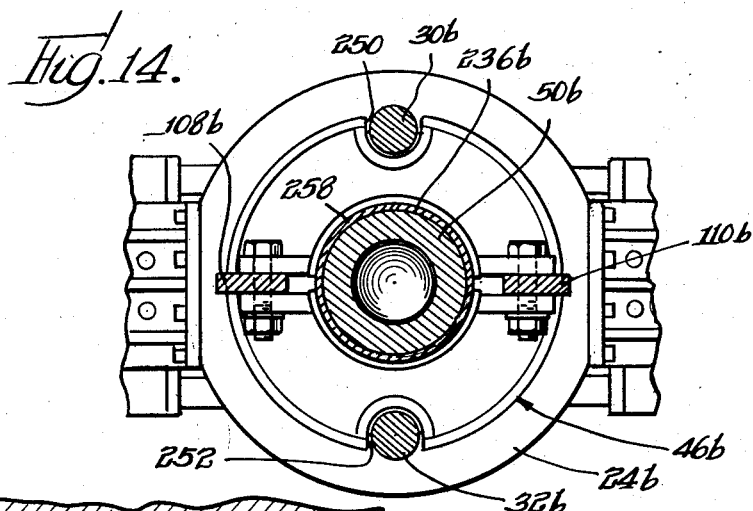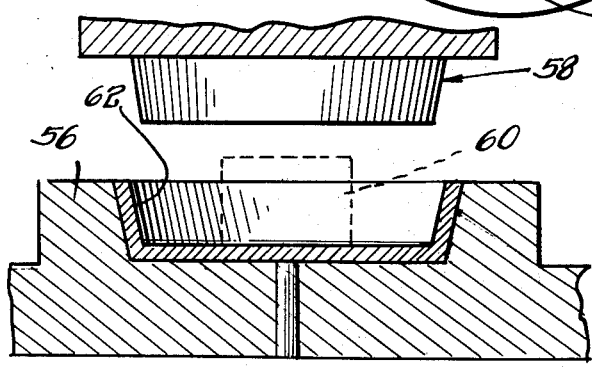

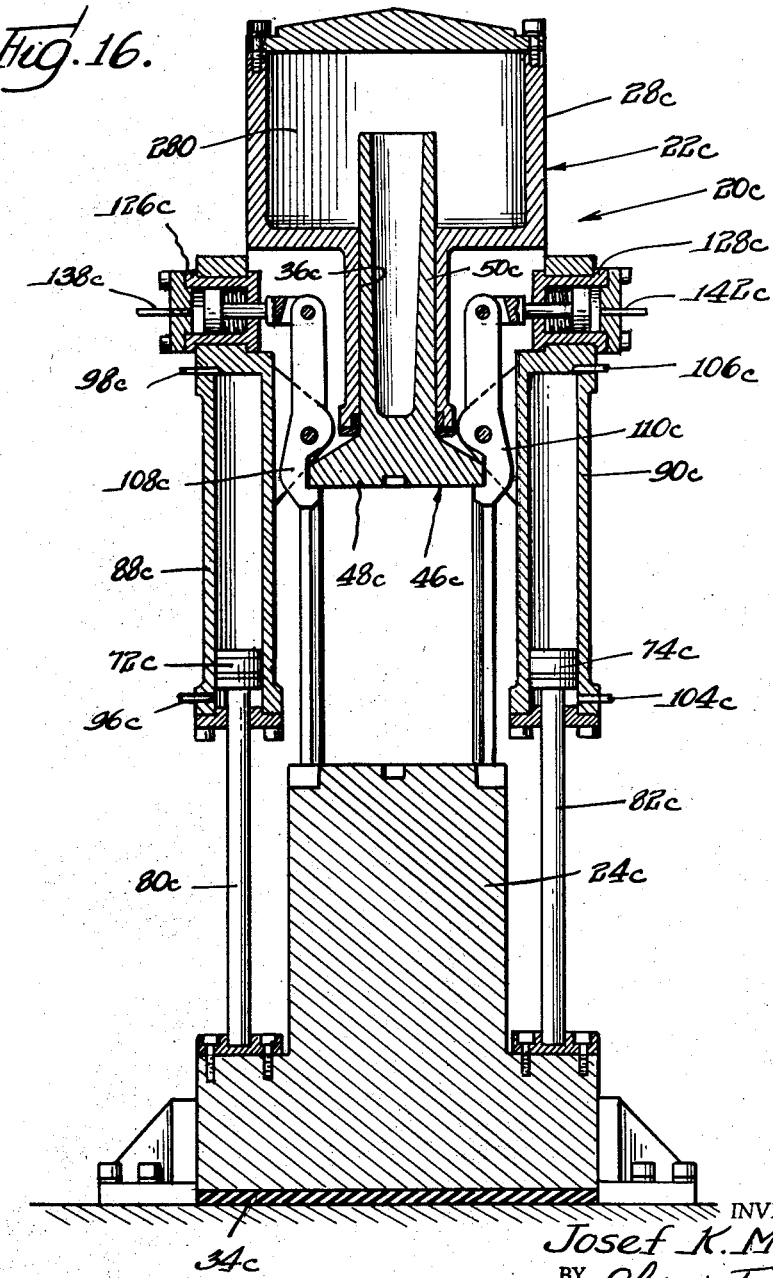

United States Patent Office 3,187,548
Patented June 8, 1965

3,187,548
HIGH ENERGY MACHINE
Josef K. Murek, San Diego, Calif., assignor to Trans
Energy Corporation, New York, N.Y., a corporation of
Delaware
Filed Sept. 13, 1961, Ser. No. 137,877
5 Claims. (Cl. 72—437)

The present invention relates to a novel forming apparatus or machine, and more specifically to a novel high energy rate or high velocity impact forming machine.

Forming machines have heretofore been proposed which utilize compressed gas for driving a ram at a high velocity through a working stroke for accomplishing high energy rate forming or working of various workpieces. The high velocities and energies utilized in such machines are greatly beneficial in the processing of certain workpieces, but at the same time such high velocities and energies can and have caused serious injury and damage to the machine itself so that certain heretofore proposed machines have not been commercially acceptable. Not only have certain proposed structures been unreliable, but they have been frequently relatively complicated so as to be expensive to build and maintain and so as to be relatively slow in operation and difficult to adjust.

An important object of the present invention is to provide a novel high energy rate forming machine which is of simplified and more economical and reliable construction.

A more specific object of the present invention is to provide a novel and simplified high energy rate forming machine which is capable of repeated work cycles over a substantial period of time without material damage to the machine itself.

Still another object of the present invention is to provide a novel high energy rate forming machine of the above described type which is constructed so that the ram thereof may be returned or reset relatively quickly after a working stroke.

A further specific object of the present invention is to provide a novel machine of the above described type which is constructed so that the "dwell time" of the ram after a working stroke is reduced and minimized so that the ram may be substantially immediately withdrawn from the work after the working stroke thereof.

A further specific object of the present invention is to provide a novel machine of the above described type having hydraulic means for returning or resetting the ram after a working stroke, which machine is constructed so that the hydraulic oil of the resetting means and the gas utilized for actuating the ram are separated whereby air may be used as the gas without creating a fire or explosion hazard.

Another object of the present invention is to provide a structure whereby the energy with which the ram is engaged against a workpiece may be easily changed and adjusted.

Other objects and advantages of the present invention will become apparent from the following description and the accompanying drawings wherein:

FIG. 1 is a sectional view taken generally along line 1—1 in FIG. 2 showing a machine incorporating features of the present invention;

FIG. 2 is a side elevational view of the machine;

FIG. 3 is a plan view of the machine shown in FIGS. 1 and 2;

FIG. 4 is an enlarged fragmentary sectional view taken generally along line 4—4 in FIG. 3;

FIG. 5 is an enlarged fragmentary sectional view taken along line 5—5 in FIG. 2;

FIG. 6 is a side elevational view showing a machine incorporating a modified form of the present invention;

FIG. 7 is a sectional view taken along line 7—7 in FIG. 6;

FIG. 8 is a schematic diagram showing a hydraulic and control circuit for the machine of FIGS. 1 through 5;

FIG. 9 is a partial sectional view taken generally along line 9—9 in FIG. 6;

FIG. 10 is an enlarged fragmentary sectional view showing a portion of the machine of FIGS. 6, 7 and 9 in greater detail;

FIG. 11 is a partial sectional view taken generally along line 11—11 in FIG. 12 showing another embodiment of the present invention;

FIG. 12 is a side elevational view of the apparatus shown in FIG. 11 partially broken away in order to show certain details of the structure;

FIG. 13 is a plan view taken generally along line 13—13 in FIG. 12;

FIG. 14 is a sectional view taken along lines 14—14 in FIG. 11;

FIG. 15 is a fragmentary sectional view showing one type of work operation which may be performed with machines of the present invention; and FIG. 16 is a vertical sectional view showing another modified form of the present invention.

Referring now more specifically to the drawings wherein like parts are designated by the same numerals throughout the various figures, an apparatus 20 incorporating one embodiment of the present invention is shown in whole or in part in FIGS. 1–5 and 8. In this embodiment, the apparatus or machine 20 comprises a main frame 22 which is preferably formed in one piece such as by casting or the like. The frame 22 comprises a substantially solid base portion or bed 24 having an upwardly facing supporting surface 26. A head portion 28 of the frame 22 is spaced above the surface 26 and supported by opposite side portions 30 and 32.

The one piece frame 22 is relatively rugged and capable of withstanding and absorbing the high impact loads which arise during operation of the machine. The simple one piece construction enables the frame to be manufactured in an economical manner.

The machine is constructed so that the frame may be installed on any floor capable of supporting its weight. In other words, the frame and other portions of the machine are constructed and arranged so that little, if any, of the impact loads which occur during operation of the machine will be transferred to the floor or other supporting structure. However, a pad 34 of rubber or rubber-like material or any other suitable resilient material is preferably interposed between the base 24 of the frame and the floor for absorbing vibrations which occur during operation of the machine.

The head portion 28 of the frame is provided with a centrally located vertical bore or chamber 36 therethrough. An upper end of the bore is closed and sealed by a suitable threaded plug 38 and an O-ring or the like 40 mounted between a portion of the plug and the smooth wall of the bore 36. A passageway 42 extends through the plug 38, which passageway is closed by a filling and check valve 44 which may be of known construction so that it need not be described in detail. The valve 44 is such that gas under high pressure may be introduced therethrough and into the bore 36 for the purpose discussed below. Any suitable means, not shown, may be provided for connection to the filling and check valve 44 for supplying air or any other desired gas under pressure to the bore or chamber 36.

A ram 46 which is preferably formed in one piece is slidably assembled with the head portion 28 of the frame. The ram comprises an enlarged and relatively heavy head section 48 and an elongated reduced diameter support and guide section 50 which closely and slidably fits within the bore 36. An O-ring 52 or other suitable sealings means is provided between the upper or trailing end of the ram section 50 and the smooth wall of the bore 36 so that the ram serves to close and seal the lower end of the bore 36.

The trailing section 50 of the ram combines with the bore in the head portion 28 of the frame to provide an expandable pressure chamber which, as indicated above, is adapted to be filled with a suitable gas under a high pressure. Preferably the trailing and guide section 50 of the ram is made substantially hollow or provided with an elongated axially extending bore 54 so as to increase the volume of the pressure chamber and reduce the mass of the trailing section of the ram. When the ram is in the elevated or retracted position shown in FIG. 1, the volume of the expandable pressure chamber provided by the bores 36 and 54 is reduced to a minimum and the gas therein is relatively highly compressed and may, for example, be at a pressure of about 2,000 p.s.i. It is to be understood however, that the pressure of the gas may be varied in accordance with the particular requirements of any given installation.

While the machine of the present invention is capable of performing a wide variety of tasks, FIGS. 1 and 15 show complementary die members 56 and 58 respectively mounted on the base or bolster 24 of the frame and on the head portion of the ram for accomplishing a "back extrusion" operation and forming a blank 60 of stock material into a desired article 62. This back extrusion operation may be accomplished with a single stroke of the ram.

When a forming operation is to be performed, the ram, which is retained in the manner described below, is released. The gas under high pressure within the expandable chamber then expands at a rapid rate so that the ram is driven downwardly from the position shown in FIG. 1 toward the work at a very high velocity. As the ram moves downwardly, the pressure chamber provided by the bore 36 and the bore 54 expands as does the gas within the chamber, and it is to be noted that there is no substantial restriction within the pressure chamber which tends to reduce the rate at which the gas expands. In other words, a high percentage of the energy stored in the compressed gas in the pressure chamber is utilized for driving the ram downwardly and against the workpiece.

In order to support and giude the head section 48 of the ram as it traverses the space 63 between the head and bolster of the frame, vertical guide members 64, 66, 68 and 70 are secured to the opposite side sections 30 and 32 of the frame as shown in FIGS. 1 and 3. Each of these guide members is provided with angularly disposed guide surfaces adapted to engage and support an adjacent corner portion of the ram head section 48. It will be appreciated that these guide members may be easily and economically produced and then assembled with the frame of the machine.

In accordance with another important feature of the present invention simple and efficient fluid or hydraulically operated means is provided for resetting or recocking and controlling the operation of the ram. This means comprises fixed pistons 72 and 74 disposed in vertical recesses or slots 76 and 78 formed in opposite sides of the frame 22. The pistons 72 and 74 are respectively fixed to the base of the frame by upstanding rods 80 and 82 which in turn are secured by means of screws 84 and 86.

Hydraulic cylinders 88 and 90 are respectively slidably disposed on the pistons 72 and 74 for up and down movement in the slots 76 and 78 and relative to the frame 22 of the machine. The double acting cylinder 88 is provided with ports 92 and 94 at its lower and upper ends respectively below and above the piston 72, which ports are connected by hydraulic conduits or lines 96 and 98 with a source of fluid pressure in the manner described below. The cylinder 90 is provided with similar ports 100 and 102 at its lower and upper ends, which ports are connected with fluid lines or conduits 104 and 106.

The slots 76 and 78 intersect the space 63 as shown best in FIGS. 1 and 3. This enables latch or hook members 108 and 110 respectively pivotally connected at 112 and 114 to ears 116 and 118 extending from upper ends of the cylinders 88 and 90 to project into the space 63 for engagement with the head section 48 of the ram. As shown best in FIG. 4, the latch or hook member 108 is provided with a shoulder 120 adapted to engage beneath and retain the head section of the ram. The hook member 108 is also provided with a beveled lower end surface 122 cooperable with a beveled upper surface 124 of the ram head for facilitating snapping of the hook member around the margin of the ram head when the apparatus is operated in the manner described below. The hook member 110 is provided with identical abutment and beveled surfaces for cooperation with the ram head and need not be described in detail.

As shown in FIGS. 1 and 4, the hook or latch members 108 and 110 are adapted to engage beneath and retain the ram in the elevated or cocked position. In order to release the ram for a downward or work stroke, means is provided for pivoting the latch members so as to disengage them from the ram. This means comprises fluid operated cylinders 126 and 128 transversely disposed on and secured to upper ends of the cylinders 88 and 90. As shown in FIG. 4, a piston 130 slidably disposed within the cylinder 126, which piston is connected by a rod 132 and a pivot pin 134 with an upper end of the latch member 108. While fluid or hydraulic means may be provided for actuating the piston 130 in opposite directions, a compression spring 136 is shown in FIG. 4 disposed within the cylinder 126 for urging the piston 130 toward the retracted or left-hand position as viewed in FIG. 4, and a suitable fluid under pressure is adapted to be introduced into the cylinder through a conduit 138 for actuating the piston toward the right.

The latch member 110 is pivotally connected to a piston rod 140 as shown in FIGS. 1 and 3, which piston rod is in turn connected to a spring biased piston, not shown, within the cylinder 128. The piston and spring means within the cylinder 128 are identical to those within the cylinder 126 and need not be described in detail. A fluid or hydraulic line 142 corresponding to a line 138 is connected with the cylinder 128.

When the hook or latch members 108 and 110 are engaged beneath the ram as shown in FIG. 1, the pressure or load imposed by the ram tends to cause the upper ends of the cylinders 88 and 90 to swing inwardly. In order to counteract this tendency and absorb transversely directed thrusts, bearing means are provided adjacent the upper ends of the cylinders 88 and 90 for engagement with the outer side surfaces of the frame 22. More specifically, ring like support or bracket members 144 and 146 are respectively clamped on upper end portions of the cylinders 88 and 90 as shown in FIGS. 1 and 3. Stub shafts 148 and 150 extend outwardly from opposite sides of the ring member 144 and respectively carry rollers 152 and 154 which engage a flat outer side surface 156 of the machine frame. Similar stub shafts 158 and 160 are carried by the bracket member 146 and in turn support rollers 162 and 164 which engage an outer side surface 166 of the machine frame.

The cylinders 88 and 90 are further supported and guided not only by the fixed pistons 72 and 74 but also by bearing elements 168 and 170. These bearing elements are mounted in generally semi-cylindrical brackets 172 and 174 respectively which are fixed by means of suitable screws or other fastening devices to the opposite sides of the machine frame in the vicinity of the pistons 72 and 74. The bearing elements 168 and 170 restrain the cylinders 88 and 90 against any tendency to shift laterally outwardly away from the machine frame.

As indicated above, in order to actuate the machine when the ram is in the raised or cocked position shown in FIG. 1, fluid under pressure is introduced into the cylinders 126 and 128 through the conduits 138 and 142 so as to pivot the latch members 108 and 110 against the action of the springs within the cylinders 126 and 128 and thereby release the ram. Then as the ram is driven downwardly in the manner previously described, the upper ends of the cylinders 88 and 90 are vented or connected with a drain while fluid under pressure is introduced into the lower ends of the cylinders through the conduits 96 and 104. This causes the cylinders 88 and 90 to move downwardly relative to the fixed pistons 72 and 74 and the machine frame so as to lower the latch members 108 and 110 for reengagement with the ram head. During such downward movement of the cylinders 88 and 90, the fluid pressure in the cylinders 126 and 128 is relieved so that the springs within these last mentioned cylinders cause the latch elements 108 and 110 to be positioned for engagement with the ram. Thus, as the cylinders 88 and 90 approach their lowermost positions, the latch members 108 and 110 are engaged against and snapped around the head section 46 of the ram as shown in broken lines in FIG. 1.

After latch members have been reengaged with the ram, the lower ends of the cylinders 88 and 90 are vented or connected with a drain line and hydraulic fluid under pressure is introduced into the upper ends of these cylinders through the conduits or lines 98 and 106. The cylinders 88 and 90 immediately start to return toward their raised position. The ram is, of course, retained by the latch members and substantially immediately starts to return toward its raised or recocked position with the cylinders 88 and 90. The cylinders may be stopped, and the ram may be released at any desired height between the lower and fully raised positions whereby the force or energy with which the ram is driven against the work may be varied and adjusted.

It will be appreciated that various fluid or hydraulic means may be provided for actuating or controlling the cylinders 88, 90, 126 and 128, and one such means is schematically shown in FIG. 8. In this embodiment a hydraulic pump 180 is provided, which pump is continuously driven by any suitable prime mover, not shown, and has an inlet connected with a hydraulic reservoir and an outlet connected with a conduit 184. A pressure relief valve 186 is connected with the conduit 184 for returning excess hydraulic fluid to the reservoir. The conduit 184 is also connected by branch conduits 186 and 188 to inlet ports of valves 190 and 192 respectively.

The valve 190 is a self-centering three position valve of known construction and is provided with a port connected by means of a conduit 194 with the conduits 96 and 104 which in turn are respectively connected to the lower ends of the cylinders 88 and 90. The valve 190 has a third port connected by a conduit 196 with the conduits 98 and 106 which are respectively connected with the upper ends of the cylinders 88 and 90. A fourth port of the valve 190 is connected with a drain line 198. When the valve element of the valve structure 190 is in a first or central position, the conduits 194 and 196 are blocked so that the cylinders 88 and 90 are hydraulically locked against movement.

A first electrical solenoid 200 is connected with the valve structure 190 for shifting the valve to another or second position in which communication is established between the pressure supply or inlet conduit 186 and the conduit 194 and communication is established between the conduit 196 and the drain line 198. Thus, when the solenoid 200 is energized the valve 190 is conditioned so that fluid under pressure is directed to the lower ends of the cylinders 88 and 90 while the upper ends of the cylinders are connected with the drain so as to cause the cylinders to move downwardly.

Another solenoid 202 is associated with the valve 190 for shifting the valve from the above mentioned second position to a third position in which the conduit 196 is connected with the conduit 186 and the conduit 194 is connected with the drain line 198. Therefore when the solenoid 202 is energized, the valve 190 is conditioned so that the lower ends of the cylinders 88 and 90 will be connected with the drain line while fluid under pressure is directed into the upper ends of the cylinders so as to cause the cylinders to move toward their uppermost positions.

The valve 192 which may also be of known construction is provided with an outlet port connected to a conduit 204 which in turn is connected with the cylinders 126 and 128 through the conduits 138 and 142. Another port of the valve 192 is connected with the drain line 206. The valve 192 is a two position valve and is spring biased to a first position in which the conduit 204 and thus the cylinders 126 and 128 are connected with the drain line 206. A solenoid 208 is associated with the valve 192 for actuating it to the second position in which the drain line is blocked and the conduit 204 is connected with the inlet conduit 188 so as to actuate the cylinders 126 and 128.

Suitable means is provided for energizing the solenoids 200, 202 and 208 and obtaining the desired control of the fluid cylinders. In the embodiment shown, the solenoids 200 and 208 are connected by wires 210 and 212 and suitable branch wires with power lines L1 and L2. A push button switch or the like 214 is connected in the wire 210 so that the circuit is normally open. The solenoid 202 is connected with the power lines by wires 216 and 218 in which normally open limit switches 220 and 222 are connected in series. The limit switches 220 and 222 are respectively disposed to be engaged and closed by the cylinders 88 and 90 when the cylinders have reached the lowermost point of their downward movement and the latch members respectively carried thereby have engaged beneath the ram. A relay 223 is connected in series with the switches 220 and 222 for closing a circuit 225 by passing the limit switch and thereby energizing the solenoid during upward movement of the cylinders. This upward movement can be stopped at any time to adjust the height or cocked position of the ram by manually or otherwise releasing the relay 223 so as to open the circuit and deenergize the solenoid 202.

In order to operate the machine when the ram is in the raised or cocked position, it is merely necessary for an operator to close the switch 214 so as to energize the solenoids 200 and 208 and cause the cylinders 126 and 128 to be actuated for pivoting the latch members and releasing the ram. At the same time, of course, the valve 190 is operated in the manner described above so that the cylinders 88 and 90 are positively hydraulically driven downwardly. When the cylinders reach their lower position the switch 214 is opened whereby the valve 192 is spring returned toward its original position and the cylinders 126 and 128 are also spring returned so that the latch members respectively associated therewith are repositioned for subsequent engagement with the ram. The latch members are reengaged with the ram as shown in broken lines in FIG. 1 and the cylinders engage and close the limit switches 220 and 222 so that the solenoid 202 is energized for actuating the valve 190 and thereby reversing the flow of hydraulic fluid under pressure from the lower to the upper ends of the cylinders 88 and 90. This action immediately causes the cylinders to start returning the ram toward its raised or recocked position. These cylinders 88 and 90 are then retained in the recocked positions by the hydraulic fluid therein.

FIGS. 6, 7, 9 and 10 show a machine similar to the apparatus described above as indicated by the application of identical reference numerals with the suffix *a* added to corresponding elements. This embodiment differs in that the frame 22a is constructed of multiple parts rather than in one piece. More specifically, the base or bolster 24a is separate from the head portion 28a and is joined thereto by separate side plates 30a and 32a which are suitably secured to the head portion and the bolster by screws or fastening means. This structure is also relatively simple and economical and at the same time provides substantial strength and rigidity.

The machine 20a shown as being supported by four shock absorbers 34a disposed adjacent the four corners of the base or bolster 24a. Upper ends of the shock absorbers 34a are connected by means of brackets 230 to the bolster and lower ends of the shock absorbers are secured to plate members 234 which in turn are mounted on a support structure such as that shown in FIG. 9. It is to be understood however, that if desired, the shock absorbers 34a which may be of any known construction, could be replaced by a resilient or rubber pad disposed beneath the bolster in the same manner as the pad 34 described above.

Another feature of this embodiment is shown best in FIGS. 9 and 10 and relates to the construction of the frame head portion 28a and the ram whereby a fluid pressure chamber of increased volume is provided and improved support and guiding of the ram is obtained while friction between the ram and the head portion is minimized. More specifically, the head portion 28a is provided with a relatively thin walled depending cylindrical section 236 defining the chamber or bore 36a. The trailing section 50a of the ram 46a is also generally cylindrical and telescopes over the cylinder 236 so that the volume of the cylinder 236 is in no way diminished.

Referring specifically to FIG. 10 it is seen that the inner generally cylindrical surface of the trailing ram section 50a is formed with series of annular grooves 238 and ribs 240. The ribs 240 have relatively sharp edges and adapted closely to conform to and to slide along the outer cylindrical surface of the section 236. When the ram is in the elevated position, the gas or fluid under pressure tends to leak past the ribs 240 to the seal 52a until the pressure in the various annular spaces defined by the grooves 238 is substantially equalized and equal to the pressure within the cylinder 236. Upon the release of the ram and during the downward movement thereof, the rapid motion of the ram causes the fluid pressure within the grooves 238 to increase substantially. Thus, the fluid under relatively high pressure in the grooves tends to hold the ram away from and in centered relationship with respect to the cylinder 236 so that there is, in effect, a fluid bearing between the ram and the cylinder and friction is minimized. Furthermore, this structure resists any tendency of the ram to twist relative to the cylinder 236 so that the ram is effectively and accurately guided during its downward or working stroke.

The means for recocking and controlling the ram 46a differs from the corresponding means described above primarily in that the hydraulic or fluid cylinders 126a and 128a are mounted in fixed relationship with respect to the frame 22a. Thus, the piston rods 132a and 140a are provided with enlarged generally vertically apertured fittings 242 and 244 at ends therof through which vertical extensions 246 and 248 of the latch members 108a and 110a slidably extend.

FIGS. 11 through 14 show another embodiment of the present invention which is similar to the structures described above as indicated by the application of identical reference numerals with the suffix b added to corresponding elements. In this embodiment the frame means 22b is provided with opposite side guide and connecting rods 30b and 32b which extend upwardly from the base or bolster 24b and support the head portion 20b. This embodiment further shows how, in certain instances, the head portion 28b may be made in a plurality of parts which are secured together by suitable fastening means.

The head portion 48b of the ram 46b is provided with notches 250 and 252 at opposite sides thereof for slidably receiving the guide and connecting rods 30b and 32b respectively. Preferably bearing elements 254 and 256 are mounted in recesses in the notches 250 and 252 for slidably engaging the guide rods. In this embodiment, the trailing section 50b of the ram telescopes within the cylindrical section 236b of the frame head portion 28b.

In the embodiment of FIGS. 11–14, the means for recocking and controlling the ram 46b is constructed so as further to promote rapid return of the ram to its elevated or cocked position. As shown best in FIGS. 12 and 15, the latch members 108b and 110b are pivotally connected by pins 112b and 114b to ears which extend from an annular bracket 258 mounted around the lower end of the cylinder 236b and fixed against axial movement with respect to the frame of the machine. Upper end sections of the latch members 108b and 110b project above the frame head portion 28b and are respectively pivotally connected to piston rods 132b and 140b. As in the previous embodiments separate cylinders which may be either pneumatically or hydraulically operated may be provided for actuating the pistons associated with the rods 132b and 140b. However, as shown in the drawings a single cylinder 260 is mounted on top of the frame head portion 28b for simultaneously operating the pistons in opposite directions. As will be understood fluid under pressure may be introduced into opposite end portions of the cylinder through a line 262 for actuating the pistons in opposite directions, and spring means may be provided between the pistons for returning the pistons.

As indicated above, the latch members 108b and 110b are supported so that they remain at a fixed elevation above the base or bolster 24b of the machine frame. In order to raise or recock the ram after it has been released by the latch members 108b and 110b, one or more identically operated pistons 264 are disposed in one or more bores 266 formed in the bolster 24b, which pistons carry rods 268 adapted to engage beneath the ram. In the embodiment shown, four of the pistons 264 and associated elements are provided for engaging the ram at points generally evenly spaced around the periphery of its lower face.

As shown in FIG. 12 a fluid inlet passageway 270 extends through the bolster 24b and intersects the lower end of each of the bores or cylinders 266. The fluid passageways 270 are adapted to be connected to any suitable source of hydraulic fluid under pressure, and suitable hydraulic control means, not shown, may be provided for alternately connecting the ports 270 with the source of fluid under pressure and with a drain line. With this arrangement it will be obvious that immediately upon completion of its downward or working stroke, the ram 46b may be engaged by the piston rods 268 for starting the return toward the raised or recocked position. Of course, after the ram has been returned so that it is reengaged and retained by the latch members 108b and 110b, the ports 270 will be connected with a drain line or otherwise vented so that the pistons 264 will return to their lowered or retracted positions.

In order to promote a rapid return of the pistons 264 to their lowered or retracted positions, the spaces in the bores or cylinders 266 above the pistons 264 are sealed by suitable plugs 272 and O-rings or the like 274, and such spaces are filled with air or any other suitable gas under a relatively high pressure. The gas under pressure trapped in the upper portions of the bores 266 serves to drive the pistons 264 downwardly when the pressure on the hydraulic fluid in the lower ends of the bores is relieved. Suitable ports 276 are provided communicating with the upper ends of the bores 266 so that the air or the gas under pressure may be introduced into the bores.

FIG. 16 shows another embodiment of the present invention which is similar to the structures described above as indicated by the application of identical reference numerals with the suffix c added to corresponding elements. In this embodiment the head portion 28c of the machine frame is formed so as to provide an enlarged chamber 280 communicating with the bore 36c and combining therewith to provide the pressure or power chamber of the machine. It is to be noted that the volume of the chamber 280 is relatively large as compared with the displacement of the trailing section 50c of the ram or the volume of the hollow interior of the trailing section 50c. As a result of this relationship, the gas pressure within the chamber will remain relatively constant regardless of the position of the ram or, in other words, after the ram has been extended and engaged against a workpiece, the pressure within the chamber 280 will have dropped only slightly. The resulting relatively high pressure in the chamber after the chamber has been expanded or, in other words, after the ram has been extended, serves to provide a static force which supplements the impact force of the ram for insuring proper finishing of the work and also to restrain any tendency of the ram to bounce.

While the preferred embodiments of the present invention have been shown and described herein, it is obvious that many structural details may be changed without departing from the spirit and scope of the appended claims.

The invention is claimed as follows:

1. A machine comprising frame means including a bolster portion and a head portion spaced therefrom and connected thereto, means on said head portion and including a reciprocable ram member providing sealed expandable and collapsible pressure chamber means for containing gas under pressure for driving the ram member from a retracted position toward said bolster portion, piston means supported by said frame means and having an axis substantially parallel to an axis of said ram member, hydraulic cylinder means slidably disposed on said piston means and reciprocable parallel to said ram member, and means on said cylinder means for releasably engaging said ram member for returning the ram member to and retaining the ram member at said retracted position, said means for releasably engaging and retaining said ram member comprising a latch element pivotally connected to said cylinder means.

2. A machine, as defined in claim 1, which includes bearing means carried by said cylinder means and engageable with said frame means for guiding the cylinder means with respect to the frame means.

3. A machine, as defined in claim 1, wherein a trailing section of said ram member is hollowed.

4. A machine, as defined in claim 1, wherein said chamber means comprises a first relatively large volume section including a first portion having a relatively large diameter and a second cylindrical portion having a relatively small diameter, said ram member being telescopically associated with said cylindrical portion.

5. A machine, as defined in claim 4, wherein said cylindrical portion has a predetermined axial length, and said ram member includes a trailing end section having a length greater than said predetermined length and slidably extending through said cylindrical portion.

References Cited by the Examiner

UNITED STATES PATENTS

| | | | |
|---|---|---|---|
| 500,720 | 7/93 | Rebsamen | 309—4 |
| 949,993 | 2/10 | Blanchard | 309—4 |
| 1,465,918 | 8/23 | Redinger | 78—25 |
| 2,163,517 | 6/39 | Oeckl et al. | 78—25 |
| 2,220,036 | 10/40 | Fitzgerald et al. | 78—25 |
| 2,241,184 | 5/41 | Clark | 78—42 |
| 2,449,647 | 9/48 | Fitzgerald | 78—37 |
| 3,108,503 | 10/63 | Murek | 78—42 |

FOREIGN PATENTS 156,864   3/58   Sweden.

CHARLES W. LANHAM, *Primary Examiner.*

RICHARD H. EANES, *Examiner.*